United States Patent Office 3,527,015
Patented Sept. 8, 1970

3,527,015
METHOD AND APPARATUS FOR FILLING CAPSULES
Theodore F. Aronson, Glen Cove, N.Y., and Van B. Hostetler, Indianapolis, Ind., said Aronson assignor, by mesne assignments, to Eli Lilly and Company, Indianapolis, Ind., a corporation of Indiana
Filed Oct. 7, 1968, Ser. No. 765,519
Int. Cl. B65b 1/04
U.S. Cl. 53—37          27 Claims

ABSTRACT OF THE DISCLOSURE

This disclosure is directed to a method and apparatus for filling and handling a capsule, and comprises essentially the conveying of a capsule having a cap portion and body portion through a series of operating stations by a pair of complementary endless conveyor means each having complementary capsule holding means. The respective conveyor means are guided through the successive stations along a predetermined path in which the conveyor means and their complementary capsule holding means moved into and out of alignment to effect sequentially the feeding, separation, filling and reassembling of the respective capsule portions, and the subsequent ejection of the reassembled capsule. Thereafter this capsule holding means of the respective conveyor means are purged of any defective capsules.

PROBLEM IN THE ART

Heretofore considerably difficulty has been encountered in the art of filling a capsule having a cap portion and a body portion which are interfitted together with a predetermined amount of material and/or an article. It was customary to feed an assembled, but emptied capsule onto a conveyor. As the conveyor was advanced toward a filling station, the capsule was operated upon by a relatively complicated mechanism having intricately moving fingers to effect the separation of the cap portion of the capsule from the body portion of the capsule prior to filling. The removed capsule cap portion was then temporarily carried in a relatively loose manner adjacent the body portion on the conveyor means as the conveyor was advanced through the filling station. However experience has proven that such procedure in effecting the separation and the conveyance of the respective capsule portions through a filling operation was unsatisfactory for the reason that the movement and/or vibration imparted to the moving conveyor frequently resulted in the removed cap portion of the capsule being shaken loose of the conveyor means. When this occurred the dislodged capsule portion and its holder invariably jammed the mechanism of the apparatus.

To effect the reassembly of the capsules, in the event the respective capsule portion was successfully conveyed through the filling station, the separated capsule portions were reassembled by the operation of intricate finger moving mechanism similar to that effective the separation of the capsules, but programmed to operate in reverse.

OBJECTS

It is an object of this invention to provide a method and apparatus for conveying a capsule or the respective portions thereof through a series of operating stations in a secured manner.

Another object is to provide a method and apparatus in which the respective capsule portions are conveyed on complimentary conveyors traveling in a predetermined path wherein complementary portion thereof are successively moved in alignment and misalignment to effect successively the separation, filling, and reassembly of the capsule portions respectively in a relative simple, efficient and positive manner.

Another object is to provide a method and apparatus for filling a capsule in a substantially continuous uninterrupted manner.

Another object is to provide a method and apparatus in which the respective complementary positions of the capsules are readily separated and reassembled in a manner in which the respective capsule portions are positively held in place throughout the operating cycle.

A BRIEF SUMMARY OF THE INVENTION

The foregoing objects and other features and advantages are obtained by a method and apparatus in which a plurality of capsules to be filled are successively conveyed through a series of operating stations in a manner in which the respective capsule portions are at all times positively held in place on conveyor as the capsules are separated, filled and reassembled. The method comprises the steps of successively feeding an empty capsule comprising a cap portion and an interfitted body portion in a moving capsule holding means having complementary portions for accommodating the cap portion and the body portion of the capsule respectively. The capsules are successively fed into the moving line of capsule holders when the complimentary portions of the holder are disposed in alignment. The aligned capsule holder portions with capsule disposed therein are then successively subjected to an environment of reduced pressure to effect separation of the cap portion from the body portion of the capsule within the aligned complementary capsule holder portions. On separation of the capsule within the aligned holder portions, the respective complementary capsule holder portions are moved out of alignment so that the capsule holder portion carrying the body of the capsule is exposed for filling. Upon placing of the material or article into the body portion of the capsule, the respective capsule holder portions are then moved into alignment so that the respective capsule portions are disposed one above the other in slightly spaced relationship. The capsule portions thus disposed in alignment are moved toward one another to effect reassembly to confine the material therein while retained within their respective aligned holder portions. Thereafter the assembled and filled capsules are successively ejected from their respective holder means. If desired the respective capsule holder portions may thereafter again be brought into misalignment whereby the respective capsule holders portions are individually purged of any defective capsule portion which may be retained therein. After purging the complementary holders portions are again brought into alignment whereby the method is repeated.

An apparatus by which the foregoing method may be automatically performed comprises a frame on which there is mounted an endless conveyor means comprising a pair of complementary flexible conveyors, each having connected thereto a plurality of complementary capsule holders. Means are provided for guiding the respective flexible conveyors through a predetermined path of travel so that the respective capsule holders carried thereby are alternately moved into and out of alignment in a predetermined manner. The arrangement is such that the capsule holders of the respective conveyors are disposed in alignment as they pass through a station in which the capsules are successively fed into each aligned capsule holder passing therethrough. The capsule holder is defined so that the cap portion of the capsule received therein is retained in the uppermost capsule holder portion with the body portion of the capsule extending therethrough to be received in the lower aligned complementary capsule holder portion. The respective aligned capsule holders with capsule therein passes over a zone of reduced pressure to subject the body portion of capsule to a negative pressure to cause the body of the capsule to be pulled or separated from the connected cap portion retained in the upper capsule holder. In separating this body portion of the capsule is seated in the lower capsule holder where upon the respective capsule holders are guided in divergent paths to expose the open end of the body portion of the capsule to a filling means at a filling station. As the capsule holder carrying the body portion of the capsule moves through the filling station, the respective body portions are suitably filled. The complementary conveyors and their associated capsule holders are then redirected into alignment whereby a cooperative cam actuated pin or ejector is brought to bear on the aligned capsule portions within the capsule holder to effect reassembly and ejection of the capsule from its respective capsule holder. Upon ejection of the capsules from its respective capsule holders, the complementary conveyors are again guided through divergent path or travel whereupon capsule holders carried thereby are respectively operated upon by ejector means to purge the respective holders of any defective capsules which may have became stuck or jammed therein.

A feature of this invention resides in a method of conveying a capsule through a series of operating stations in a manner in which the complementary capsule portions are positively held in place to result in a more positive and faster filling operation.

Another feature resides in the provision of an improved conveyor means for transporting the respective capsule portions through a capsule filling operation.

Another feature of this invention resides in the provision of a method and apparatus which can efficiently and effectively fill a capsule in a relatively simple, positive and expedient manner.

Another feature of the invention resides in the provision of a pair of complementary flexible conveyors each having a plurality of connected capsule holding means wherein the conveyors are arranged to be guided in a predetermined manner so that respective portions of the complementary capsule holding means are moved into and out of alignment in a predetermined manner so as to effect the feeding separation, filling, reassembly and ejection of the capsules carried thereby during a filling operation in a continuous and uninterrupted manner.

Other features and advantages will become more readily noted when considered in view of the drawings and specification in which.

Figures 1, 1A, 14:
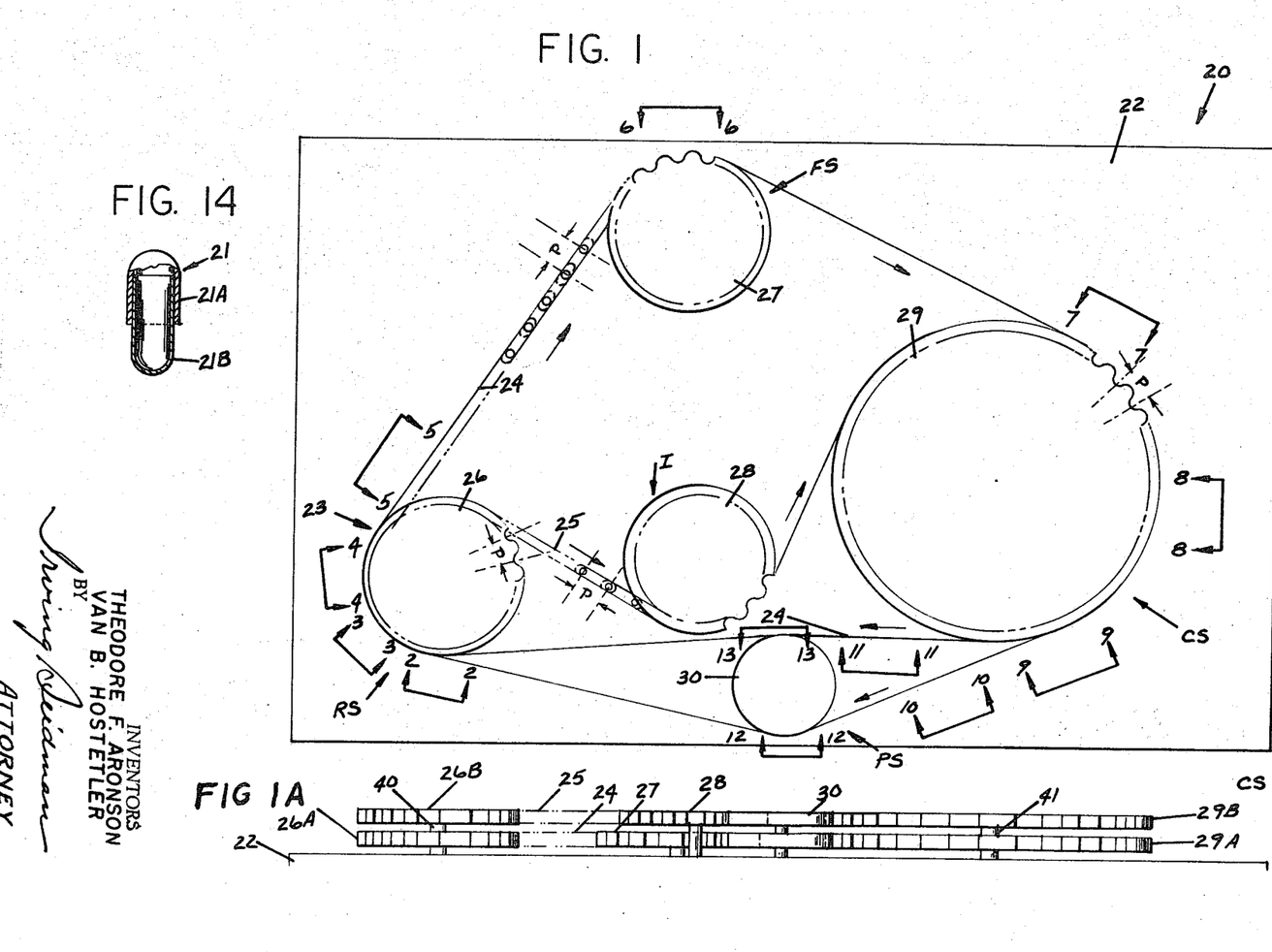
FIG. 1 illustrated a diagrammatical plan view of a capsule filling apparatus illustrating a preferred embodiment of the present invention.
FIG. 1A is a schematic side elevation view of FIG. 1.
FIG. 14 is a sectional view of a typical capsule to be filled by the method and apparatus to be described.

Referring to the drawings it is illustrated in FIG. 1 a diagrammatic plan view of an apparatus 20 for filling capsules 21 with a predetermined amount of powdered material or other article of manufacture. Capsules 21 on which the apparatus illustrated is intended to operate comprises a cap portion 21A and a complementary body portion 21B which are generally interfitted in the assembled position thereof (see FIG. 14). The respective complementary capsule portions 21A, 21B may be semispherical or semieliptical in shape. In the illustrated form a generally elliptical shape capsule is shown. Such capsules 21 when used as a pill to encase therein a predetermined amount of medicinal powder are formed of a digestible material. Such capsule construction has also been used to package other articles of commerce, e.g. small toys, novelties and many other articles of commerce when used as a package for such articles of commerce, the complementary capsule portions 21A, 21B may be formed of other material as for example, plastic, glass, metal etc.

The apparatus 20, illustrated, is directed to a means whereby capsules 21 may be readily filled with a predetermined amount of powdered material or other article in a substantially continuous manner. The apparatus 20 includes a supporting surface or frame 22 on which the complement parts or various operating stations are suitably supported. The illustrated apparatus 20 is particularly directed to a means by which a plurality of capsules 21 are sequentially and successively conveyed through a series of operating stations in which an emptied capsule is first separated, then filled with a material or article, and thereafter reassembled to confine the material or article therein. The filled and reassembled capsule is then ejected permitting the cycle of operation to be continuously repeated.

The means by which the respective capsules are operated upon to effect the disassembly thereof in preparation to filling and reassembly thereof on the completion of the filling operation as the capsules are conveyed from station to station comprising a conveyor means comprising a pair of juxtapositional, superposed endless flexible conveyors 24, 25, each carrying a plurality of connected complementary capsule holding means 24A, 25A respectively. The respective endless conveyors 24, 25 and their associated capsule holding means 24A, 25A carried thereon are guided in a predetermined path about spaced apart guide means 26, 27, 28, 29 and 30. The guide means are positioned so that the conveyors 24, 25 and capsules holding means 24A, 25A carried thereby are brought into and out of alignment in a timed or synchronous relationship as will be hereinafter described.

In the illustrated form of the invention the respective conveyors 24, 25 are each formed as a flexible chain of connected links 31, 32 respectively. The guide means 26 to 30 comprise a series of complementary toothed sprockets about which conveyor chains 24 and 25 are guided in a predetermined manner so that certain portions of the respective chans are traveling in aligned unison as other portions thereof are moving in a nonaligned path.

As best seen in FIGS. 2 to 13 each conveyor 24, 25 comprises a chain formed of plurality of connected links 31, 32 which are pivotedly secured by a hollow pin or sleeve 33, 34, which in the illustrated form of this invention in turn defines a capsule holding means. The respective pin or sleeves 33, 34 securing the adjacent ends of adjacent links is fitted with a bearing sleeve 35 to define a bearing or pivotable connection for the spaced links. A spacer or roller 36 circumscribing the respective bearing sleeves 35 maintains the spacing between spaced link plates 31A, 32A of the respective links 31, 32. It will be noted that the spacing between centers are of successive links 31, 32 of the respective chains 24, 25 are uniform so that the capsule receiving sleeve 33, 34 or the respective chains can be brought into alignment during a predetermined portion of their respective travel.

Figures 2, 3, 4, 5, 6:
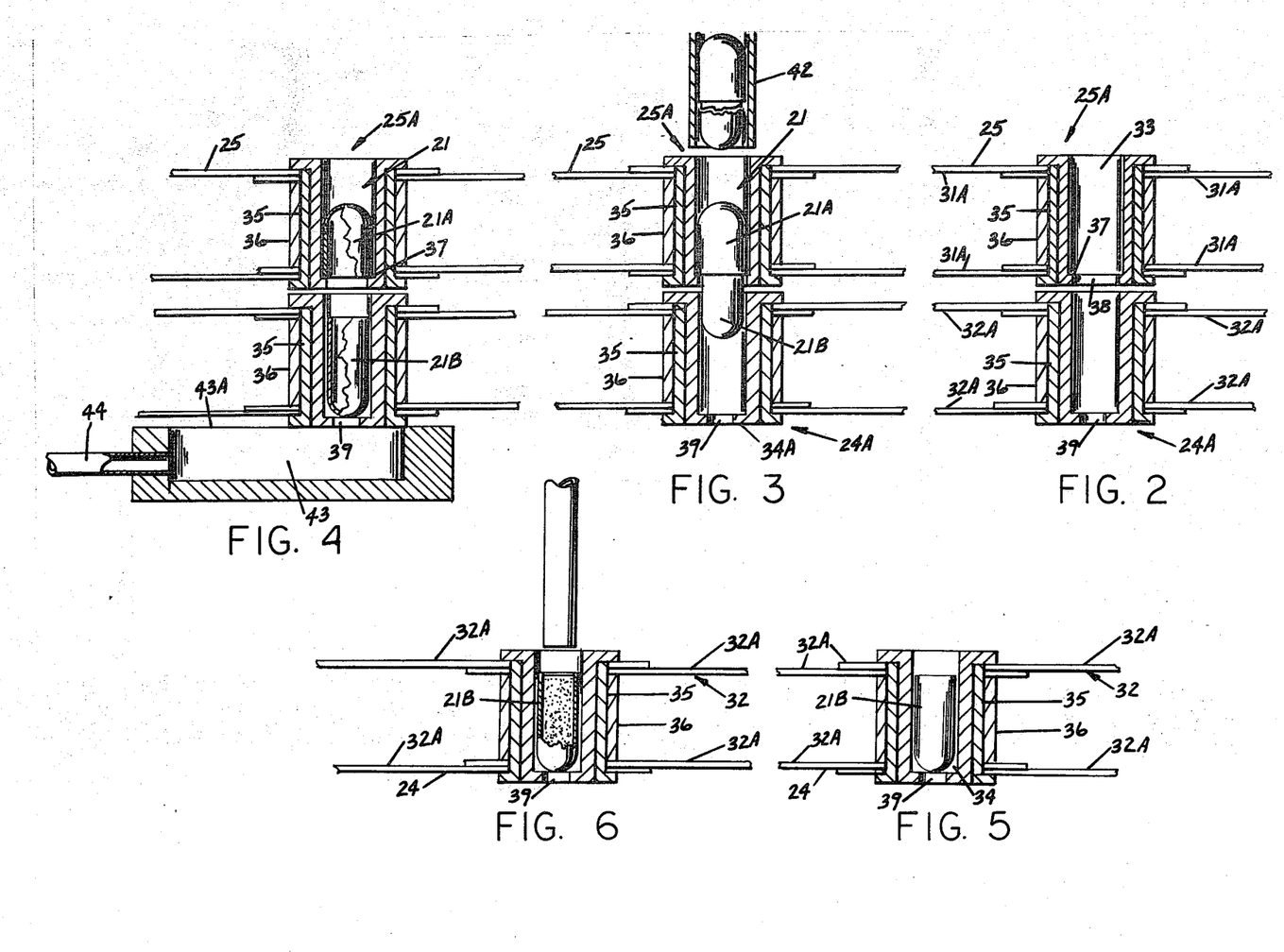
FIG. 2 is a detailed fragmentary side elevation view of the conveyor taken along line 2—2 on FIG. 1.
FIG. 3 is a detailed fragmentary side elevation view taken along line 3—3 on FIG. 1.
FIG. 4 is a detailed fragmentary section view taken along line 4—4 on FIG. 1.
FIG. 5 is a detailed fragmentary side elevation view taken along line 5—5 on FIG. 1.
FIG. 6 is a detailed fragmentary side elevation taken along line 6—6 on FIG. 1.

As noted in FIGS. 3 and 4 the capsule receiving sleeve 33 of the upper conveyor or chain 25 is provided with a turned shoulder or flange 37 circumscribing a bottom opening 38. The capsule holder or receiving sleeve 34 of the lower conveyor 24 is provided with a bottom opening 39 having a diameter which is less than the diameter of the capsule 21 adapted to be received therein.

Referring to FIG. 1 the lower conveyor chain 24 and associated capsule holders 33 are guided in an endless path about a series of spaced guide means or toothed sprockets 26, 27, 29 and means 30 whereas the upper conveyor chain 25 and its capsule holder 34 are guided in an endless path about guide means or toothed sprockets 26, 28, 29 and means 30. Since the respective conveyors 24, 25 are illustrated as constructed of a flexible chain of connected links, the guide means comprise toothed sprockets about which the respective conveyor chains are adapted to mesh. Guide means or sprocket 26 about which the respective conveyors travel, comprise a pair of similarly shaped sprockets 26A, 26B about which the respective chains 24, 25 mesh. Sprockets 26A, 26B are coaxially journalled to a common shaft 40 which may be suitably connected in driving relationship to a suitable power source (not shown). The teeth of sprockets 26A and 26B are disposed in alignment, and the root or spacing between the teeth on the respective sprockets 26A, 26B are machined or formed to complement the O.D. of the roller or spacer 35 of the chain having a given pitch so that the O.D. of the chain pivot fits the root of the respective gear teeth. In doing so the upper and lower chains 24 and 25 are driven in synchronization about sprockets 26A, 26B so that the center line of the upper and lower capsule holders are coincident or in absolute alignment. As the respective chains 24, 25 engage the periphery of sprockets 26A, 26B, the respective capsule holders carried in the chain links are brought into perfect alignment and move about sprockets 26A, 26B in perfect synchronization, with the capsule holders of the upper and lower chains disposed in alignment one above the other, as best seen in FIGS. 2, 3 and 4. Thus it will be noted that the P between successive capsule holders of the respective links equal the P between adjacent teeth of the sprockets.

Guide means 29 also comprises a pair of spaced similarly formed sprockets 29A, 29B coaxially journalled to a common shaft 41 about which conveyors 24, 25 mesh. Sprockets 29A, 29B are also provided with teeth which are arranged on their respective sprockets so as to be disposed in alignment. As described with respect to sprockets 26A, 26B, the teeth of sprockets 29A, 29B are formed with a root diameter size to complement the diameter of bearing 36 of the respective upper and lower chain links and that the distance P between adjacent root centerlines coincide with "P" between adjacent capsule holders or chain pivots. Thus it will be noted that as the upper and lower chains 24, 25 engage the respective periphery of sprockets 29A, 29B, the respective chains are again brought into synchronization so that the respective capsule holder portions 33 and 34 are synchronously driven in perfect alignment through station CS.

Disposed between guide means 26 and 29 there is provided a sprocket 27 about which the lower conveyor chain 24 meshes and a sprocket or idler 28 about which the upper conveyor chain 25 is guided. An idler means 30 is provided downstream of guide means 29 to direct the respective conveyor chain 24, 25 in separate paths to effect a purging of the respective capsule holders 33, 34 as will be hereinafter described.

Cooperatively associated with the coaxially disposed sprockets 26A, 26B to define a capsule feed station is a hopper (not shown) for containing a supply of assembled but empty capsules which are adapted to be successively fed to the respective capsule holders as the conveyor chain 24, 25 round sprockets 26A, 26B in alignment. The hopper is of conventional or well known structure which operates to successively orient and feed the capsules to a feed tube 42 whereby the capsules are successively deposited into the aligned moving capsule holders 33, 34 of the respective conveyors 24, 25 in rounding sprockets 26A, 26B at the feed or receiving station R.S. As best seen in FIG. 3 the capsule, received in the aligned capsule holders 33, 34 body first as the conveyors 24, 25 are moving in synchronization about sprockets 26A, 26B, is retained therein by the edge of the cap portion 21B being seated upon the internal lip or flange 37 formed in the bottom of the holder sleeve 33. In this position the body portion 21B of the capsule 21 is spaced from the bottom 34A of the lower holder portion 34 carried by the lower conveyor 24. Spaced downstream from the point at which the capsules are fed into the respective aligned capsule holders 33, 34 and contiguous the bottom of the lower conveyor 24, there is located a vacuum chamber 43 having a slotted opening 43A adapted to be in communication with the aperture or opening 39 formed in the bottom 34A of the lower holder 34 as the bottom conveyor chain 24 moves over the vacuum chamber 43. The vacuum chamber 43 in turn is connected to a source of reduced or negative pressure as for example, a vacuum pump not shown by suitable connecting conduit 44. As the lower conveyor or chain 24 passes over the slotted opening 43A of the vacuum chamber 43, the negative pressure produced thereby causes the body portion 21B of the capsule 21 to be pulled away from its cap portion 21B so as to be seated on the bottom 34A of the holder 34, as seen in FIG. 4. In this manner the body portions 21B of the respective capsules to be filled are thus separated from their respective cap portions as the conveyor chains are moving in unison and in alignment about the sprockets 26A, 26B of the receiving or feed station R.S.

As the respective conveyors 24, 25 move beyond the vacuum blocks 43 position of the receiving station R.S., the respective conveyors 24, 25 are parted to effect lateral planar misalignment therebetween whereby the lower conveyor containing the body portion 21B of the capsule is directed or guided around sprocket 27, operatively associated with a filling station F.S., whereas the upper conveyor 25 carrying the cap portion of the capsule in its respective holders 33 is directed about an idler sprocket 28 disposed opposite to the filling station FS.

Figure 7:
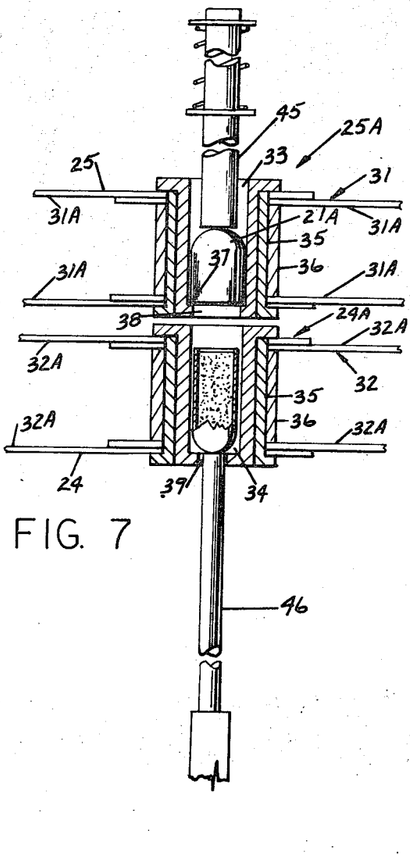
FIG. 7 is a detailed fragmentary side elevation view of the apparatus taken along line 7—7 on FIG. 1.

The filling station FS cooperatively associated with sprocket 27 and synchronized in movement therewith includes a conventionally constructed filling means (not shown) in the form of a powder hopper or supply and associated pick up means for placing predetermined measures of a powdered material into each capsule body portion being carried through the filling station. The cap carrying conveyor 25 moving in unison with conveyor 24 upon being guided about idler 28 again brought into alignment with conveyor 24 as the respective conveyors mesh about sprockets 29A, 29B. When the respective conveyors reach a predetermined portion along the circumference of sprockets 29A, 29B, the respective capsule holders 33, 34 of the respective conveyor portions thereof are again disposed in substantial alignment as seen in FIG. 7. Thus the body portion filled with material is disposed directly beneath the cap portion 21A of the capsule 21 carried in the holder 33 of the upper conveyor 25.

Figures 8, 9:
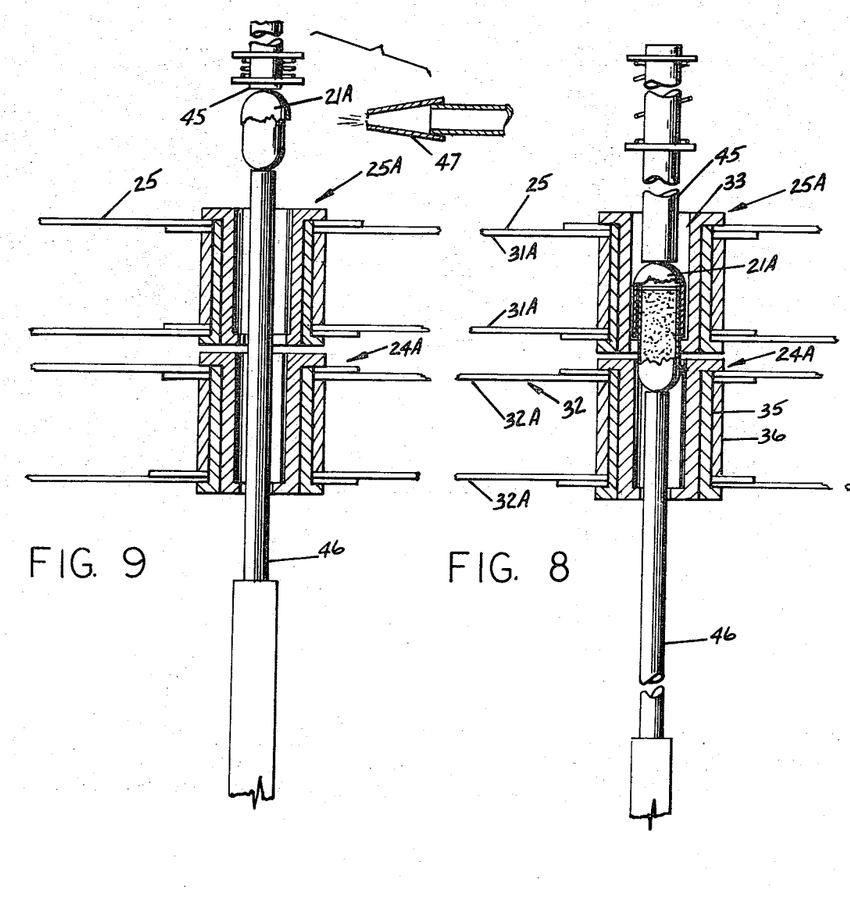
FIG. 8 is a detailed fragmentary sectional side elevation view taken along line 8—8 on FIG. 1.
FIG. 9 is a detailed sectional side elevation view taken along line 9—9 on FIG. 1.
Figures 10, 11, 12, 13:
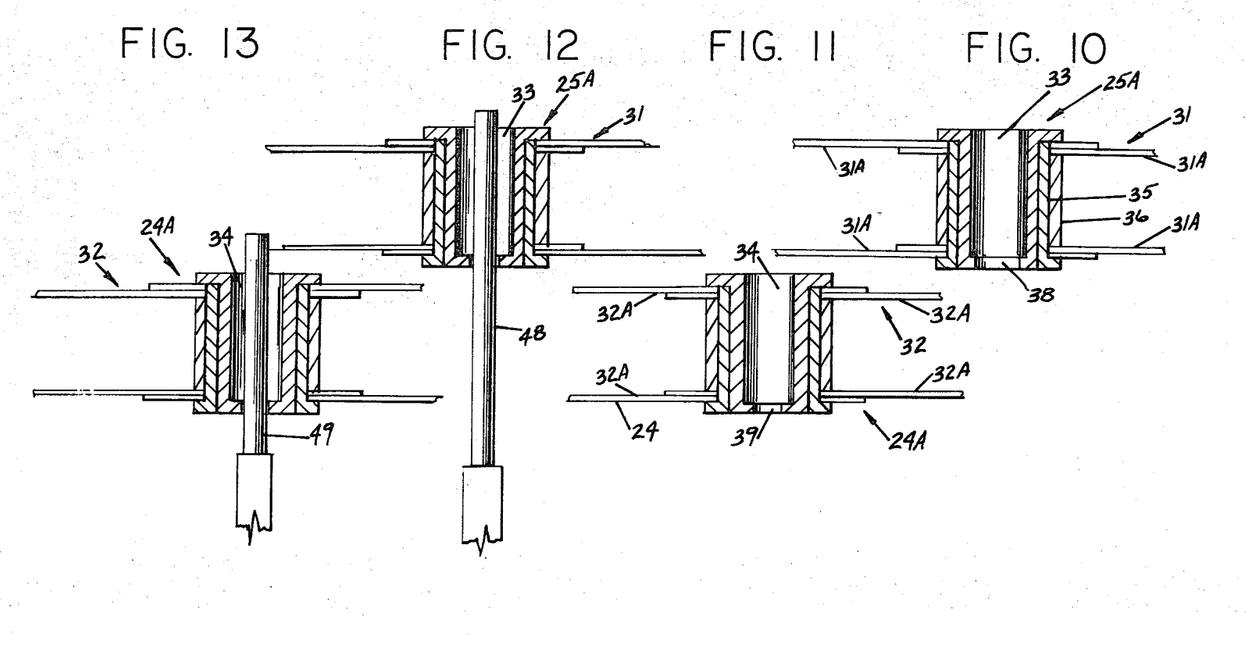
FIG. 10 is a detailed fragmentary sectional side elevation view taken along line 10—10 on FIG. 1.
FIG. 11 is a detailed sectional side elevation view taken along line 11—11 on FIG. 1.
FIG. 12 is a detailed fragmentary sectional side elevation view of a portion of the apparatus taken along line 12—12 on FIG. 1.
FIG. 13 is a detailed fragmentary sectional side view of the invention taken along line 13—13 on FIG. 1.

Cooperatively associated with sprockets 29A, 29B to define a closing and ejecting station are a series of moving fingers movably mounted in a rotating plate disposed above and below the respective conveyors and which are arranged to rotate in unison with sprockets 29A, 29B. The fingers are preferably cam actuated to extend into and out of the respective capsule holders 33, 34. as the aligned capsule holders 33, 34 are brought in alignment. The arrangement is such that under the influence of a suitable cam, upper fingers 45 are progressively lowered to bear against the upper end of the cap portion 21A of the capsule as seen in FIG. 7. The lower fingers 46 in turn are progressively raised under the influence of a cam to effect displacement of the filled body portion 21B of the capsule toward the cap to effect reassembly of the capsule for confining the material therein. (Note FIG. 8.) Thus as the conveyors 24, 25 move about sprockets 29A, 29B from approximately position indicated by position 7—7 to position 8—8 the lower finger 46 is gradually displaced under the influence of an approximate cam to displace the capsule portion 21B toward the cap 21A. Thus as the conveyors traverse a circumferential portion of the sprockets 29, the capsule portion 21A and 21B are reassembled as shown in FIG. 8. As the conveyors 24, 25 are moved further about the circumference of sprockets 29A, 29B, the cooperating fingers extending into the respective capsule holders are further advanced to a position indicated in FIG. 9 wherein the reassembled capsule is ejected to a position above the conveyor means 23. As seen in FIG. 9, the pressure of the fingers 45 and 46 is sufficient to hold the capsule 21 in position therebetween. To remove the capsule 21 from between fingers 45, 46, a jet of pressurized fluid as for example compressed air from a nozzle 47 is directed against the capsule 21. As seen in FIG. 9, the jet has sufficient velocity and force to effect dislodgement or displacement of the ejected capsule 21 from between the fingers 45, 46 retaining the same.

Upon ejection of the reassembled capsule 21 from between the fingers 45, 46, the fingers are retracted to their neutral or inoperative position. By rotating the fingers 45, 46 in synchronization with sprockets 29A, 29B and by controlling reciprocation thereof by a cam, ejection of the capsule is effected as the conveyors are moving in a continuous manner.

In the illustrated form of the invention a purge station PS is interposed in the conveyor run extending between the closing and ejection station CS and the feed station RS. The purging station PS includes a pulley or sprocket 30 arranged to effect a separation or lateral planar misalignment of the respective conveyor chains 24, 25. In the illustrated form the upper conveyor 25 is guided about one side of the sprocket or pulley, while the lower conveyor is guided about the other side. If a single idler pulley is used to effect the separation or lateral planar misalignment of the upper and lower conveyors 24, 25 through the purge station PS, it will be noted that the pulley 30 would be formed with a smooth periphery thereby enabling the respective conveyor chains to slip on either side thereof. In an alternate construction complementary counter-rotating idler sprockets may be arranged to mesh with the conveyors moving thereby.

In operation it will be noted that the conveyor means 23 and the respective capsule holders 33, 34 herein described greatly simplify an apparatus for filling capsules in that the separation and reassembly of the respective capsule portions 21A, 21B can be readily effected by merely bringing the chains into and out of respective alignment in a predetermined manner during which the respective capsule portion 21A, 21B are at all times secured against dislodgement.

While the capsule holding means 33, 34 of the illustrated embodiment of the apparatus have been described as comprising a hollow sleeve type pin which pivotally secures the adjacent links of a chain conveyor, it will be understood that other conveyor constructions may be utilized. For example instead of a chain link type conveyor, a flexible timing belt may be used in which the capsule holding means may be suitably supported to one side of the timing belt.

The contemplated method for filling capsules having a cap portion and a body portion interfitted to one another of this invention comprises the steps of first successively feeding assembled emptied capsules to a moving line of aligned complementary capsule holders which have separable parts for accommodating the cap portion 21A and the body portion 21B of the capsule respectfully. The capsule 21 thus fed into the moving line of capsule holders is then separated within the capsule holder. This is attained by subjecting the aligned capsule holders to a negative pressure so that the body portion 21B is positively pulled or separated from the cap portion 21A. In doing so the cap portion is retained in one holder position and the body portion 21B retained within the complementary holder. The respective holder positions are then directed in different paths to expose the body portion to filling. An article of manufactured or powdered material is then deposited in the exposed body capsule. Thereafter respective holders are brought into alignment whereby the body portion containing the article or powdered material is disposed beneath the cap portion moving in unison therewith. With the respective capsule holders disposed in alignment and moving in unison, the capsule portion containing the material is displaced toward the cap portion and brought into interfitting relationship therewith. The capsule thus reassembled is then ejected from the aligned capsule holding means and collected in a suitable container. If desired, upon ejection of the filled capsule from the aligned capsule holders the respective conveyors are again brought into disalignment whereupon the respective misaligned capsule holders are purged of any defective capsule which may be retained therein. Upon purging of the respective capsule holders, the cycle of operation is repeated.

While the invention has been described with respect to a particular method and embodiment, it will be readily understood that variations and modifications may be made without departing from the spirit or scope of the invention..

What is claimed is:
1. In a capsule filling machine, the improvement of a means for conveying a capsule having a cap portion and a complementary body portion through the various operating stations including at least a capsule receiving station and a capsule filling station comprising:
a pair of unitary, separately flexible conveyor means,
means for guiding each of said separately flexible conveyor means relative to one another through the respective operating stations whereby said conveyor means are brought into contiguous superposed relationship through a predetermined portion of their respective path of travel,
complementary capsule receiving means carried on each of said conveyor means,
said complementary capsule receiving means being disposed in alignment when said conveyor means are brouht into contiguous superposed relationship for receiving a capsule as said conveyors pass through a capsule receiving station,
means for effecting separation of said capsule within said capsule receiving means,
and said guide means including means for effecting a change in the path of travel of the respective conveyor means upon separation of said capsule to effect lateral planar misalignment of the respective conveyor means whereby only one of said conveyor means is directed through the capsule filling station of said machine.
2. The invention as defined in claim 1 wherein said guide means include means for bringing said respective unitary conveyor means in contiguous superposed position at a point beyond said filling station.
3. The invention as defined in claim 1 wherein said complementary capsule receiving means include,
a cap holder adapted to retain therein the cap portion of a capsule connected to one of said conveyor means, and a complementary body holder for receiving the body portion of said capsule connected to the other conveyor means,
said body holder having a recess formed therein defining a seat for supporting the body of said capsule in the separated position thereof,
and means formed in said cap holder for supporting the cap portion of said capsule in the separated position thereof.

4. The invention as defined in claim 2 wherein said conveyor means are endless.

5. The invention as defined in claim 4 wherein said endless conveyor means comprise a chain conveyor.

6. In a capsule filling machine, the improvement of a means for conveying a capsule having a cap portion and a complementary body portion through the various operating stations including at least a capsule receiving station and a capsule filling station comprising:
a pair of flexible conveyor means,
means for guiding each of said conveyor means relative to one another through the respective operating stations whereby said conveyor means are brought into contiguous superposed relationship through a predetermined portion of their respective path of travel,
complementary capsule receiving means carried on each of said conveyor means,
said complementary capsule receiving means being disposed in alignment when said conveyor means are brought into contiguous superposed relationship for receiving a capsule as said conveyors pass through a capsule receiving station,
means for effecting separation of said capsule within said capsule receiving means,
said guide means including means for effecting a change in the path of travel of the respective conveyor means upon separation of said capsule whereby one of said conveyor means is directed through the capsule filling station of said machine,
said guide means including means for bringing the respective conveyor means into contiguous superposed position at a point beyond said filling station,
said conveyor means comprising an endless chain conveyor,
each of said chain conveyors includes a plurality of connected links,
each link including a pair of spaced link plates,
each of said pair of link plates having aligned apertures,
a sleeve pin extended through said aligned openings for securing said link plates,
and said sleeve pin defining the capsule receiving means.

7. The invention as defined in claim 6 wherein the sleeve pins of the upper conveyor chain have a bore extending therethrough,
said bore being defined with an inturned shoulder adjacent one end thereof for retaining the cap portion therein.

8. The invention as defined in claim 7 wherein said shoulder defines an opening sized to permit the body portion of the capsule to pass therethrough.

9. The invention as defined in claim 6 wherein the sleeve pins of the lower conveyor chain is defined with a recess for accommodating the body portions of the capsule,
said recess being slightly greater than the length of the body portion of said capsule.

10. The invention as defined in claim 9 including means defining an opening in communication with said recess.

11. The invention as defined in claim 1 and including means for synchronizing the drive of said pair of conveyor means.

12. The invention as defined in claim 10 wherein said means for effecting separation of said capsule within said capsule receiving means comprises a vacuum means positioned adjacent to said capsule receiving station.

13. Conveyor means for effecting the conveyance and separation of connected caps and body portions of a capsule comprising a pair of unitary complementary conveyor means,
each of said unitary conveyor means having complementary capsule receiving means,
said complementary capsule receiving means including a cap holder adapted to retain the cap portion of said capsule carried on one of said conveyors, and a complementary holder for receiving the body portion of said capsule carried on the other of said conveyor,
means for guiding each of said conveyors along a predetermined path of travel whereby the complementary holders of said capsule receiving means are disposed in and out of lateral alignment through predetermined portions of said predetermined path of travel for receiving therein a capsule,
separating means operatively associated with one of said aligned holders for separating the body portion from the cap portion of said capsule,
and said guiding means including means for effecting a change in the lateral travel path of one of said unitary conveyors relative to the other unitary conveyor upon separation of said cap portion from the body portion.

14. The invention as defined in claim 13 wherein said cap holder and complementary body holder each have a bore therein for receiving the capsule, in the aligned position thereof,
said cap holder having an internal shoulder defining an opening sized to retain the cap portion therein while permitting the body portion of the capsule to pass therethrough, and said body holder being sized to accommodate and carry the body portion upon separation thereof from the cap,
and means disposed in said body holder for retaining said body portion therein.

15. The invention as defined in claim 13 wherein said separating means include a vacuum means disposed in the path of travel of said conveyors,
said body holder having an opening therein adapted to be brought into communication with said vacuum means as said conveyors pass thereover said vacuum means.

16. Conveyor means for effecting the conveyance and separation of connected caps and body portions of a capsule comprising a pair of complementary conveyor means,
each of said conveyor means having complementary capsule receiving means,
said complementary capsule receiving means including a cap holder adapted to retain the cap portion of said capsule carried on one of said conveyors, and a complementary holder for receiving the body portion of said capsule carried on the other of said conveyor,
means for guiding each of said conveyors along a predetermined path of travel whereby the complementary holders of said capsule receiving means are disposed in alignment through a portion of said predetermined path of travel for receiving therein a capsule,
separating means operatively associated with one of said aligned holders for separating the body portion from the cap portion of said capsule,
and said guiding means including means for effecting a change in the travel path of one of said conveyors relative to the other upon separation of said cap portion from the body portion,
wherein said conveyor means each include an endless chain having a plurality of connected links, and said capsule receiving means include a sleeve pin which connects the adjacent links to one another.

17. In a capsule filling machine having a capsule feed station and a capsule filling station, the improvement of means for successfully conveying and handling a capsule having a cap portion and a body portion comprising a pair of unitary endless conveyor means, a complementary capsule receiving means carried on each of said conveyor means for accommodating said cap portion and body portion respectively, means for guiding each of said conveyor means along a predetermined path whereby the complementary capsule receiving means are disposed in alignment in passing through said capsule feeding station for receiving a capsule therein, means for effecting a change in the lateral path of travel of the respective unitary conveyors upon separation of said capsule portions whereby one of said conveyor means and connected capsule receiving means is directed through said capsule filling station to receive a material to be filled into the capsule portion carried thereby, means for bringing the respective complementary capsule receiving means into lateral realignment subsequent to the filling of the capsule portion passing through said filling station, means for effecting the assembly of the filled capsule portion to the other portion thereof, and means for effecting the ejection of said filled and assembled capsule from said capsule receiving means.

18. The invention as defined in claim 17 and including means for effecting a lateral change in the respective path of travel of said conveyors upon ejection of the filled and assembled capsule to effect misalignment of the respective path of travel of the said conveyor, and means to eject any defective capsule portion from the respective misaligned complementary capsule receiving means.

19. In a capsule filling machine having a capsule feed station and a capsule filling station, the improvement of means for successively conveying and handling a capsule having a cap portion and a body portion comprising a pair of endless conveyor means, a complementary capsule receiving means carried on each of said conveyor means for accommodating said cap portion and body portion respectively, means for guiding each of said conveyor means along a predetermined path whereby the complementary capsule receiving means are disposed in alignment in pasing through said capsule feeding station for receiving a capsule, therein, means for effecting a change in the path of travel of the respective conveyors upon separation of said capsule means whereby one of said conveyor means and connected capsule receiving means is directed through said capsule filling station to receive a material to be filled into the capsule portion carried thereby, means for bringing the respective complementary capsule receiving means into alignment subsequent to the filling of the capsule portion passing through said filling station, means for effecting the assembly of the filled capsule portion to the other portion thereof, and means for effecting the ejection of said filled and assembled capsule from said capsule receiving means, said endless conveyor means each comprises a chain having a plurality of links and sleeve pins interconnecting the adjacent links, and the respective sleeve pins defining the complementary capsule receiving means.

20. The invention as defined in claim 19 wherein the sleeve pins of one chain have a bore extending therethrough, and means defining a shoulder for retaining the cap portion of the capsule therein.

21. The invention as defined in claim 20 wherein the sleeve pin of the other chain have a recess for accommodating the body portion of the capsule, said recess terminating in an opening.

22. The invention as defined in claim 20 wherein said separating means comprises a vacuum chamber, and said opening of said recess being adapted to pass in communication with said vacuum chamber whereby the negative pressure acting on said sleeve pin effect separation of the capsule body from said cap.

23. A method for filling a capsule having a cap portion and a body portion interfitted to one another comprising the steps of successively feeding emptied assembled capsules into a continuously moving line of connected unitary aligned superposed complementary capsule holders having separable parts for accommodating the cap portion and body portion of the capsules accordingly, separating the emptied capsules within the holders by subjecting the bodies of the capsules to a negative pressure so that the capsule portions are retained in the respective separable parts of said respective capsule holders, imparting lateral parallel planar misalignment of the respective continuously moving capsule body portion and cap portion within their respective capsule holders upon separation of said capsule portions, synchronizing the movement of the respective capsule body portions and cap portions within their respective holders upon imparting said lateral parallel misalignment whereby the complementary capsule body portions and cap portions may be brought back into realignment, filling one of said misaligned capsule portions with a material, bringing said laterally misaligned capsule body portions and capsule cap portions carried within their respective holders into lateral, superposed realignment with respect to one another, interconnecting said capsule portions to confine the material therebetween, and ejecting the reassembled capsule and material confined therein from said capsule holder.

24. A method for filling a capsule having a cap portion and body portion and body portion interfitted to one another comprising the steps of successively feeding emptied assembled capsules into a moving line of aligned complementary capsule holders having separable parts for accommodating the cap portion and body portion of the capsule accordingly, separating the emptied capsule within the holders so that the capsule portions are retained in the respective separable parts of said capsule holders, imparting disalignment of the respective capsule holders upon separation of said capsule portions, filling one of said disaligned capsule portions with a material, bringing said disaligned capsule holders and capsule portions carried therein into realignment with respect to one another, interconnecting said capsule portion to confine the material therebetween, ejecting the reassembled capsule and material confined therein from said capsule holder and, imparting disalignment to the respective capsule holders upon ejection of the capsule therefrom, and purging the respective capsule holders to remove therefrom any defected capsule.

25. In a capsule filling machine the improvement of a pair of unitary flexible conveyor means disposed in superposed relationship, means for guiding each of said endless conveyors in which portions of said endless conveyors are each moved in lateral alignment and misalignment in an endless path, complementary capsule receiving means carried in each of said conveyor means, and said guide means being disposed relative to one another for bringing said complementary capsule receiving means in superposed aligned relationship through a predetermined portion of the respective travel thereof.

26. In a capsule filling machine the improvement of a pair of flexible conveyor means disposed in superposed relationship, means for guiding each of said endless conveyors in an endless path, complementary capsule receiving means carried in each of said conveyor means, and said guide means being disposed relative to one another for bringing said complementary capsule receiving means in superposed aligned relationship through a predetermined portion of the respective travel thereof and, each of said conveyors include a flexible chain comprising a plurality of connected links, and said capsule receiving means defining the pivotable connection between adjacent links whereby the distance between centers of adjacent link connections defining the pitch of said chains, and whereby the pitch of said chains are equal.

27. The invention as defined in claim 26 wherein said guide means for bringing said complementary capsule holders of said chains into superposed aligned relationship comprise a pair of sprocket means having a common axis of rotation, said sprocket means having a plurality of spaced teeth circumscribing the periphery of the respective sprockets, the teeth of the respective sprockets being disposed in alignment, and the spacing between teeth of the respective sprockets being formed to complement the O.D. of the respective chain pivots so that said chains are synchronously driven with said capsule holding means disposed in axial alignment.

References Cited

UNITED STATES PATENTS

| | | | |
|---|---|---|---|
| 2,412,637 | 12/1946 | Smith | 53—281 |
| 2,764,863 | 10/1956 | Kath | 53—282 |
| 3,070,932 | 1/1963 | Höfliger | 53—281 |
| 3,200,556 | 8/1965 | Ackley | 53—282 |
| 3,336,654 | 8/1967 | Ryan | 29—429 |
| 3,344,521 | 10/1967 | Fievet | 198—131 X |

TRAVIS S. McGEHEE, Primary Examiner

R. L. SPRUILL, Assistant Examiner

U.S. Cl. X.R.

53—282; 198—131